(12) United States Patent
Katariya et al.

(10) Patent No.: US 7,529,736 B2
(45) Date of Patent: May 5, 2009

(54) PERFORMANT RELEVANCE IMPROVEMENTS IN SEARCH QUERY RESULTS

(75) Inventors: Sanjeev Katariya, Bellevue, WA (US); Qi Yao, Sammamish, WA (US); Jun Liu, Bellevue, WA (US); Adwait Ratnaparkhi, Redmond, WA (US); Bradley R. Green, Atlanta, GA (US)

(73) Assignee: Microsoft Corporation, Redmond, WA (US)

( * ) Notice: Subject to any disclaimer, the term of this patent is extended or adjusted under 35 U.S.C. 154(b) by 312 days.

(21) Appl. No.: 11/123,277

(22) Filed: May 6, 2005

(65) Prior Publication Data

US 2006/0253428 A1    Nov. 9, 2006

(51) Int. Cl.
*G06F 17/30* (2006.01)
(52) U.S. Cl. .............................................. 707/3; 707/2
(58) Field of Classification Search ...................... 707/3, 707/5, 2
See application file for complete search history.

(56) References Cited

U.S. PATENT DOCUMENTS

| | | | |
|---|---|---|---|
| 6,363,378 B1 * | 3/2002 | Conklin et al. ................. | 707/5 |
| 6,738,764 B2 * | 5/2004 | Mao et al. ....................... | 707/5 |
| 6,766,316 B2 * | 7/2004 | Caudill et al. .................. | 707/3 |
| 6,873,982 B1 * | 3/2005 | Bates et al. ..................... | 707/5 |
| 6,954,750 B2 * | 10/2005 | Bradford ......................... | 707/5 |
| 7,117,207 B1 * | 10/2006 | Kerschberg et al. ............. | 707/5 |
| 2002/0042793 A1 * | 4/2002 | Choi ................................ | 707/6 |
| 2002/0169595 A1 * | 11/2002 | Agichtein et al. .............. | 704/9 |
| 2003/0028512 A1 * | 2/2003 | Stensmo ......................... | 707/1 |
| 2003/0037074 A1 * | 2/2003 | Dwork et al. ............... | 707/500 |
| 2004/0068486 A1 * | 4/2004 | Chidlovskii .................... | 707/3 |
| 2004/0111408 A1 * | 6/2004 | Caudill et al. .................. | 707/3 |
| 2005/0149504 A1 | 7/2005 | Ratnaparkhi | |
| 2005/0234904 A1 * | 10/2005 | Brill et al. ...................... | 707/5 |
| 2005/0289102 A1 * | 12/2005 | Das et al. ........................ | 707/1 |
| 2006/0136377 A1 * | 6/2006 | Patt-Shamir et al. ........... | 707/3 |
| 2007/0203887 A1 * | 8/2007 | Dynin ............................ | 707/3 |

* cited by examiner

*Primary Examiner*—Apu M Mofiz
*Assistant Examiner*—Cindy Nguyen
(74) *Attorney, Agent, or Firm*—Amin, Turocy & Calvin, LLP

(57) ABSTRACT

Property store information and an aggregation of a plurality of ranking mechanisms, including a learning mechanism, are leveraged to provide performant query results with increased user relevancy. The learning mechanism permits query feedback to be accepted to facilitate in optimizing user relevance. This mechanism can also be incorporated with traditional Information Retrieval (IR) components, each supplying independent ranking to a relevance aggregation function that determines relevancy at a high level. This precludes diminishing the value of query feedback that occurs when the data is fed into traditional IR algorithms. By allowing the query feedback to maintain its proper weighting and utilizing scope and bias capabilities of the property store information, relevance increases in a highly performant manner.

20 Claims, 7 Drawing Sheets

PERFORMANT RELEVANCE IMPROVEMENTS IN SEARCH QUERY RESULTS

CROSS-REFERENCES TO RELATED APPLICATIONS

This application is related to co-pending U.S. patent application Ser. No. 11/121,405 filed on May 4, 2005, entitled "EVALUATION AND PRICING OF USER INTERACTIONS WITH ONLINE ADVERTISEMENTS," U.S. patent application Ser. No. 11/122,281 filed on May 4, 2005, entitled "MECHANISM FOR ALLOCATING ADVERTISEMENTS OF VARYING INTERVALS," U.S. patent application Ser. No 11/133,549 filed on May 20, 2005, entitled "ADAPTIVE CUSTOMER ASSISTANCE SYSTEM FOR SOFTWARE PRODUCTS," and U.S. patent application Ser. No. 10/752,901 filed on Jan. 7, 2004, entitled "SYSTEM & METHOD FOR BLENDING THE RESULTS OF A CLASSIFIER & A SEARCH ENGINE."

TECHNICAL FIELD

The subject invention relates generally to query search engines, and more particularly to systems and methods for providing performant improvements in relevance of search query results.

BACKGROUND OF THE INVENTION

The proliferation of digital information has allowed vast amounts of data to be generated very easily from almost anywhere in the world. Communication networks, such as the Internet, allow users from different locations to access this data. Because of the vastness of the amount of information, users typically do not know how to directly access data that they desire. To overcome this problem, data search engines were developed to allow users to search for relevant data. These search engines eventually transformed into remote servers that allowed user access outside of an immediate location. Thus, the vast amounts of data became easily accessible to users in any location by simply entering a search query into a remote data search engine. Results of the query were then returned to the user in a variety of server-based formats.

The effectiveness of a search query is dependent on several factors—adequacy of the search string, accessibility of relevant data by the search engine, and relevancy ranking of the data by the search engine. Timeliness of the search result can also play a major factor in search effectiveness as well. A poorly worded search string will not return favorable results to a user, and, even if properly worded, if the search engine does not have access to relevant data, the search results will be less than effective as well. If access is available, but the search engine ranks the search result relevancy poorly, the user will also be dissatisfied with the search results because they will be forced to review all of the returned results to find relevant data.

Users highly desire a search engine that can return relevant data quickly and efficiently. However, search engines are generally not flexible in allowing a user's own relevancy ranking to be included in the results. Search servers tend to operate in a somewhat isolated environment relative to their users. This typically requires that the search servers utilize some type of algorithm to attempt to predict the relevancy results of a given query. These types of search servers have met with various levels of success, but most are usually inflexible and unable to adapt when their algorithmic dependencies change. This requires that the algorithms themselves must be changed or adjusted to increase relevance and user satisfaction. Being able to account for variations in users' opinions of relevancy and providing users with relevant results without requiring constant manual algorithmic adjustments would prove to be extremely beneficial, both to the user and to the query search server.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates generally to query search engines, and more particularly to systems and methods for providing performant improvements in relevance of search query results. Property store information and an aggregation of a plurality of ranking mechanisms, including a learning mechanism, are leveraged to provide performant query results with increased user relevancy. The learning mechanism permits query feedback to be accepted to facilitate in optimizing user relevance. This mechanism can also be incorporated with traditional Information Retrieval (IR) components, each supplying independent ranking to a relevance aggregation function that determines relevancy at a high level. This precludes diminishing the value of query feedback that occurs when the data is fed into traditional IR algorithms. By allowing the query feedback to maintain its proper weighting and utilizing scope and bias capabilities of the property store information, relevance increases in a highly performant manner, increasing user satisfaction while efficiently utilizing resources to provide the query results.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
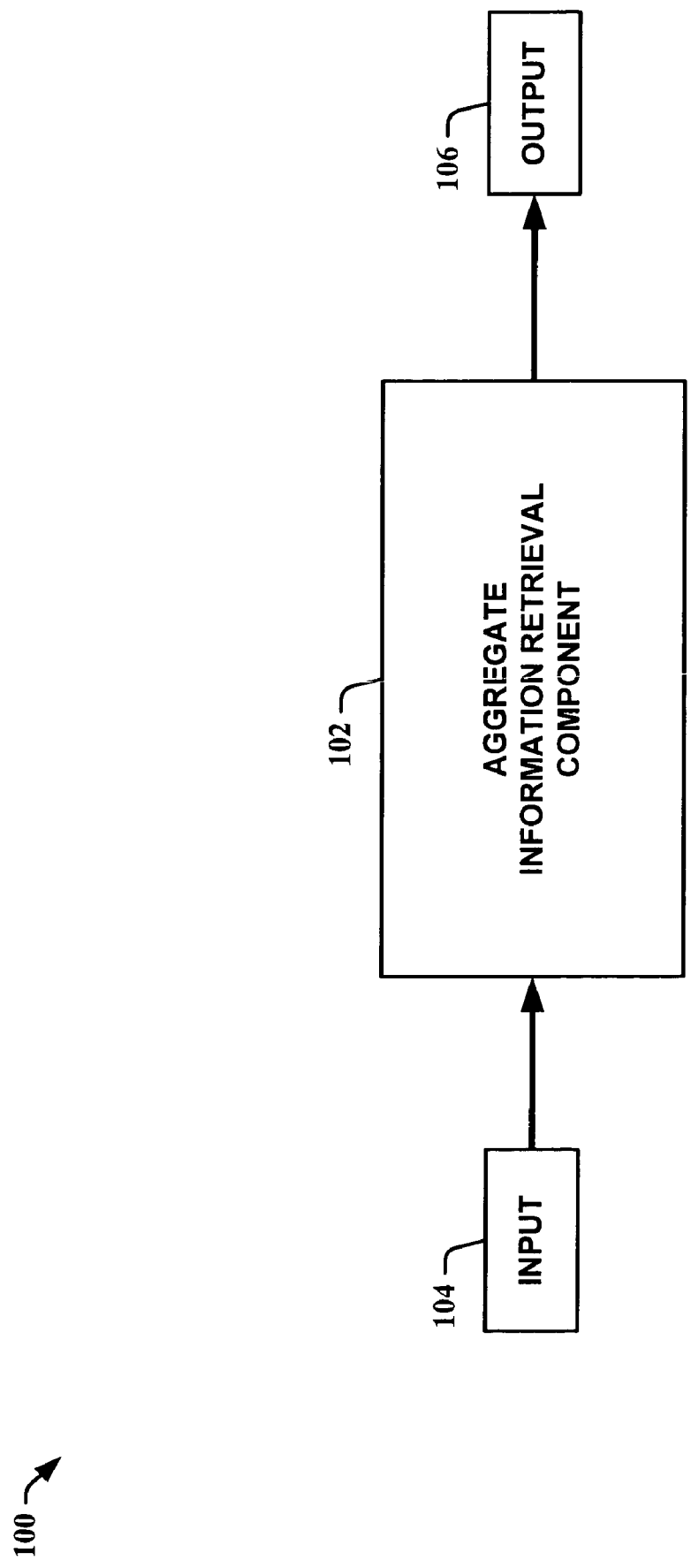
FIG. 1 is a block diagram of an aggregate information retrieval system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Search engines today utilize a traditional information retrieval (IR) mechanism that employs an OKAPI-based algorithm to determine search result rankings. However, if a search engine also incorporates a learning mechanism, it can automatically adapt and provide enhanced search query results. By further incorporating user feedback into the learning mechanism, whether from click-throughs, explicit feedback, and/or implicit feedback and the like, an increase in the relevancy of the search query results can be obtained. Previously, the output from the learning mechanism was fed into the OKAPI-based algorithm, diminishing the value of the query feedback information because the algorithm cannot properly weight the data. By allowing each mechanism to determine search query results separately, the value of the user feedback can be given a proper weighting at a higher aggregated search query level. To make the systems and methods performant, properties from a property store are utilized to bias and scope the search query. Property utilization allows efficient employment of resources directed at determining relevant search query results. The infra systems and methods are applicable to assistant platforms (AP) as well.

In general, there are typically two models at work in retrieval of results. The first is normally a traditional information retrieval (IR) based on an existing OKAPI algorithm. The second is a query term based model. This can be a learning classifier which is an adaptive modeling technique used to model queries to results. There are many levels of integration and strategies possible—however, an optimum situation is when the data structures are similar. Therefore, by leveraging the scoping and biasing capabilities of a property store, the information retrieval is performant and provides the highest relevance. Thus, the systems and methods provide a performant manner in which the two retrieval methods can be combined while making it possible to be both highly adaptive and corpi term distribution independent.

In FIG. 1, a block diagram of an aggregate information retrieval system 100 in accordance with an aspect of the subject invention is shown. The aggregate information retrieval system 100 is comprised of an aggregate information retrieval component 102 that receives an input 104 and provides an output 106. The input 104 can be a search query and/or other type of information request where a user desires to obtain information about and/or related to the input 104. The output 106 can be a search query result and/or answer list and the like and generally relates to the input 104. The aggregate information retrieval component 102 processes the input 104 by employing a plurality of input response ranking components, including a learning component, to separately determine input response rankings for the input 104. Properties stored previously can facilitate in determining the input response ranking to increase efficiency. The stored properties provide a similar sourced structure resource for the plurality of input response ranking components, including the learning component. It can also facilitate to expedite responses by allowing intelligent ordering of the response search sequence (e.g., searching the smallest search space first before the largest search space). The separate input response rankings are then aggregated at a higher level to allow proper weighting of rankings from each input response ranking component. This allows external information such as, for example, user feedback to be incorporated into a learning component and given proper weighting. Some types of user feedback such as, for example, explicit user feedback, are extremely pertinent to determining relevance. By permitting each ranking component to determine ranking in its optimum manner, the value of such relevance data is not diminished. The rankings from each ranking component can then be assessed at a higher level to yield substantially increased user relevance.

Figure 2:
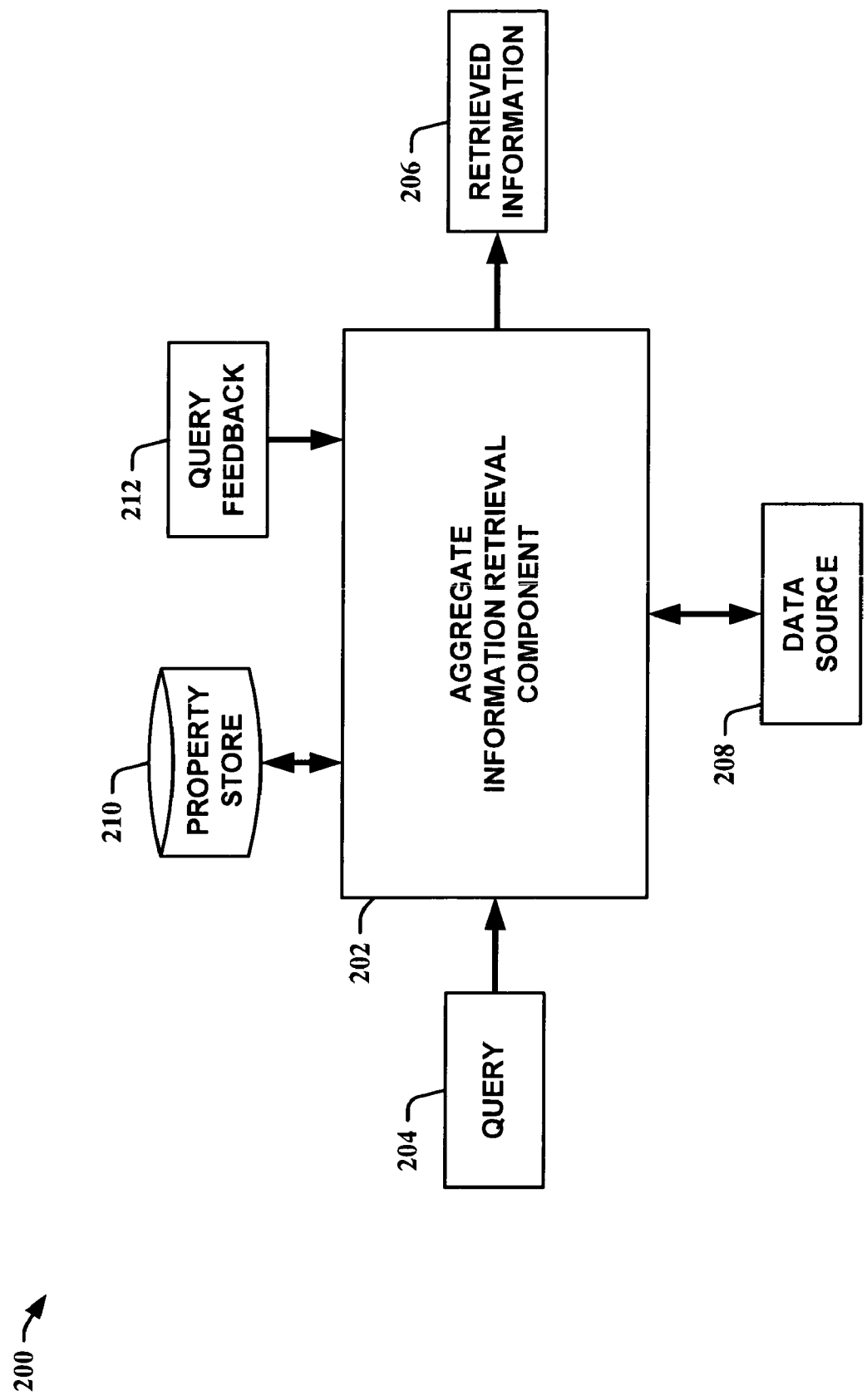
FIG. 2 is another block diagram of an aggregate information retrieval system in accordance with an aspect of the subject invention.

Turning to FIG. 2, another block diagram of an aggregate information retrieval system 200 in accordance with an aspect of the subject invention is depicted. The aggregate information retrieval system 200 is comprised of an aggregate information retrieval component 202 that receives a query 204 and provides retrieved information 206. The aggregate information retrieval component 202 in this instance also interfaces with a data source 208 and a property store 210. It 202 also receives query feedback 212 to facilitate in providing the retrieved information 206. The query 204 can be, for example, a search query entered in a search engine via the Internet and/or an intranet and the like. The data source 208 can be a single database and/or a generalized collection of data sources such as content from the Internet and the like.

The property store 210 assists in retrieving information associated with the data source 208. Typically, the property store contains "properties" about information from the data source 208. For example, if the data source is the Internet, the property store 210 can include for each document (e.g., a Web page) information such as, for example, the location (e.g., a universal resource locator (URL)), the title of the document, a summary of the document content, and possibly, for example, the source of the document (e.g., content provider) and the like. The property store 210 allows the aggregate information retrieval component 202 to be performant by providing scoping and biasing capabilities. For example, if the query 204 is extremely common (e.g., thousands or millions of possible results/answers), a user might restrict the query 204 to only results that emanate from a particular source (i.e., user enters a "scoped query"). The aggregate information retrieval component 202 employs the property store 210 to facilitate in determining the most efficient manner to process the query 204. If the desired information source is extremely small, for example, the aggregate information retrieval component 202 can first limit the search to only that particular data source before searching for terms of the query 204, saving time. The property store 210 allows this type of assessment by providing efficient access to such properties without the aggregate information retrieval component 202 first searching the entire data source 208 and then eliminating all undesired sources of information, consuming a great deal of resources and time. The property store also provides a common structure that can be utilized by IR processes and learning processes alike. One skilled in the art can appreciate that properties can be stored and managed in other forms that are within the scope of the subject invention. Other forms can include, but are not limited to, databases and property-based indexes and the like that contain property information.

The query feedback 212 represents user interaction with the system 200 that can include, for example, click-through information resulting from a user's interaction with search query results, explicit user feedback, and/or implicit user feedback and the like. Explicit feedback is typically obtained in response to a prompt regarding the quality of a search result/answer list. The prompt can actually ask the user a direct relevance question such as, for example, "was this search result useful" and the like. The user's response is invaluable because it is directed towards the relevance without necessitating any type of additional interpretation. Generally, information of this type is heavily weighted within the aggregate information retrieval component 202 when determining the retrieved information 206. However, sometimes the prompt can illicit an ambiguous response from a user such as "maybe," and/or the prompt itself might ask for a level of satisfaction such as, for example, "on a scale of 1 to 5, with five being the highest, what is your level of satisfaction with this result." These types of explicit feedback can require additional processing to determine their proper value.

Implicit feedback generally includes observed heuristics. For example, the amount of time, or "dwell time," a user looks at a search query result can give an indication as to whether they are satisfied with the result. Subsequent actions related to the query result such as, for example, continued interaction with the search query result via, for example, mouse clicks, cursor movement, etc. can also be utilized to determine implicit feedback. Situational awareness techniques can also be applied to facilitate in determining the implicit feedback. This can include, for example, discounting a long user dwell time because it is known that the user is in deep conversation with someone else while the search result is being displayed and the like.

The aggregate information retrieval component 202 utilizes these resources to facilitate in producing separately determined search query rankings. The separate rankings can employ different processes that emphasize different aspects of the search query to obtain their rankings. This allows the aggregate information retrieval component 202 to integrate with existing processes such as OKAPI-based ranking processes utilized in IR mechanisms. The existing processes are not required to be altered because the separate rankings are aggregated at a higher level. Thus, a learning-based ranking process can be integrated with the OKAPI-based ranking processes with minimal impact to the existing process, but with substantial increases in user relevance of the ranked query results. The learning-based ranking process also allows for the aggregate information retrieval component 202 to provide adaptable information retrieval with optimum utilization of user query feedback in an aggregate ranking process. This, along with utilization of the property store 210, provides a substantial increase in user relevance of the retrieved information 206 while being performant.

Figure 3:
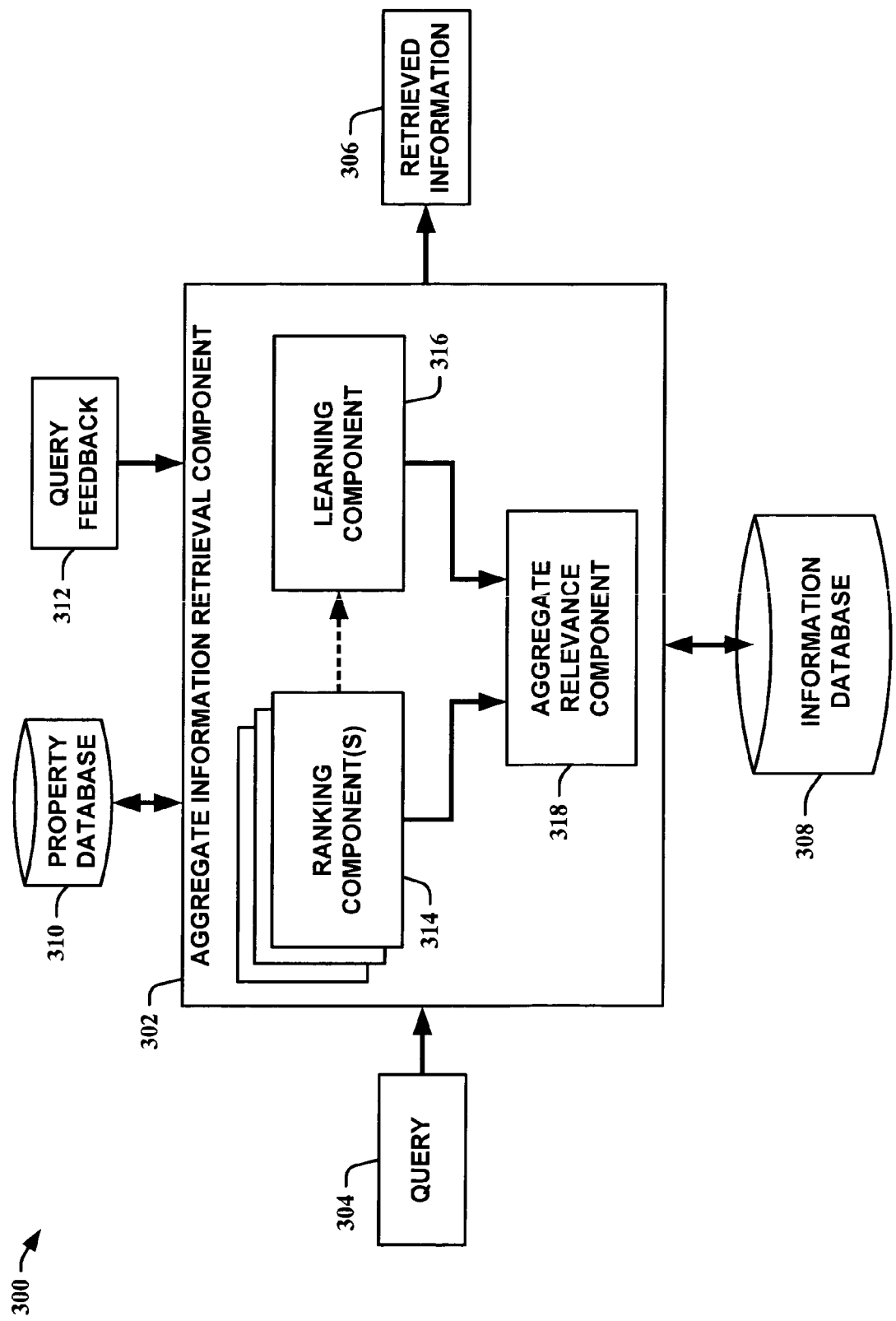
FIG. 3 is yet another block diagram of an aggregate information retrieval system in accordance with an aspect of the subject invention.

Looking at FIG. 3, yet another block diagram of an aggregate information retrieval system 300 in accordance with an aspect of the subject invention is illustrated. The aggregate information retrieval system 300 is comprised of an aggregate information retrieval component 302 that receives a query 304 and provides retrieved information 306 relating to an information database 308. The aggregate information retrieval component 302 utilizes a property database 310 (other instances can utilize a property-based index as well) and query feedback 312 to facilitate in determining the retrieved information 306. It 302 is comprised of ranking component(s) 314, a learning component 316, and an aggregated relevance component 318. The ranking component(s) 314 can include a single ranking component or multiple ranking components. It 314 can be comprised of a traditional information retrieval (IR) component and/or an additional learning component and the like. The ranking component(s) 314 typically includes an OKAPI-based ranking component that utilizes some combination of vector space, probabilistic, and/or logic based algorithms. These component(s) 314 can interface with property-based index structures as well.

The learning component 316 is an adaptable ranking component that can accept query feedback 312 to facilitate in determining its rankings. A learning model employed by the learning component 316 can include, but is not limited to, models generated from query feedback techniques such as, for example, direct feedback and/or feedback aggregation of question clusters and/or query concepts and the like. A question cluster is generally when multiple forms of expression yield the same activity (e.g., "book a flight," "travel via airplane," and "book an air travel plan" are different forms of expression that desire the same result). Thus, aggregated feedback from a question cluster can be utilized to form a learning model that does not necessarily analyze the question but looks at what question cluster it belongs to. The expressions can also include spelling variants, tense variants, and potentially synonym variants and the like. Query concepts can be obtained by analyzing conceptual threads between different queries. This allows aggregated forms of query feedback related to a central concept to be utilized. These forms of model building allow the learning component 316 to more efficiently determine its rankings. One skilled in the art can appreciate that other models can be employed by the learning component 316 and are within the scope of the subject invention. This includes current and/or future artificial intelligence means that can provide information in place of and/or in conjunction with user query feedback to improve relevance of the retrieved information 306. The learning component 316 can operate on established rankings such as those provided by the ranking component(s) 314. Thus, it 316 can optionally receive (noted as a dashed line in FIG. 3) these rankings and filter and/or re-rank with its own relevancy determinations rather than first generating its own result/answer list.

The aggregate relevance component 318 determines an aggregate relevance ranking via ranking inputs from the ranking component(s) 314 and the learning component 316. It 318 operates to combine rankings at a high level in order to facilitate preservation of the value of query feedback. This is accomplished by allowing each ranking entity 314, 316 to separately determine their rankings. Thus, each entity can fully optimize their own processes to produce their best relevancy rankings. For example, if the learning component 316 receives explicit feedback regarding query results associated with the query 304, it 316 can give heavy deference to these query results in its rankings. In previous systems, these learning results were fed into OKAPI-based algorithms which diminished their value substantially. However, the aggregate information retrieval component 302 employs the aggregate relevance component 318 to ensure that the learning component rankings are given proper weighting through aggregation at a higher level. This, combined with utilization of the property database 310 (and/or a property-based index and the like), provide instances of systems that substantially increase relevance of query results of the retrieved information 306 while still being performant.

Figure 4:
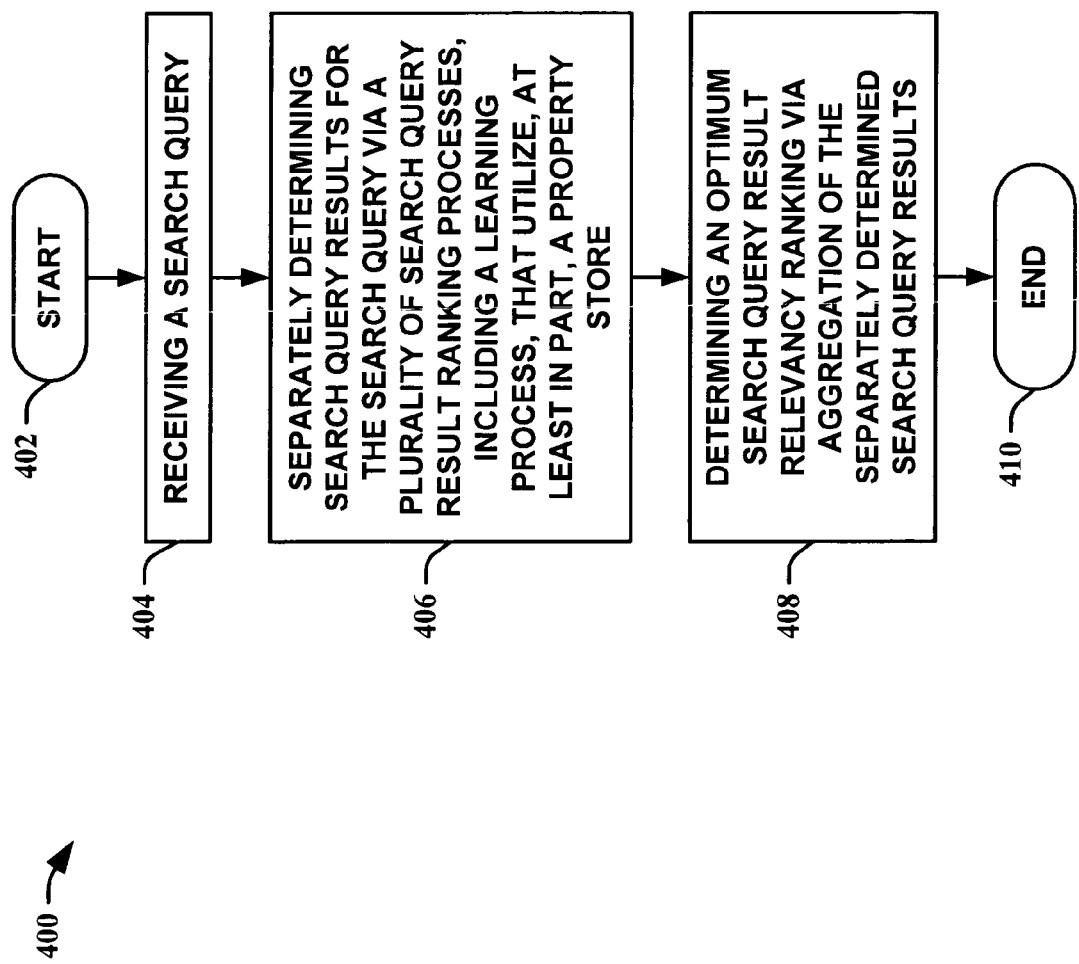
FIG. 4 is a flow diagram of a method of facilitating determination of search query results in accordance with an aspect of the subject invention.
Figure 5:
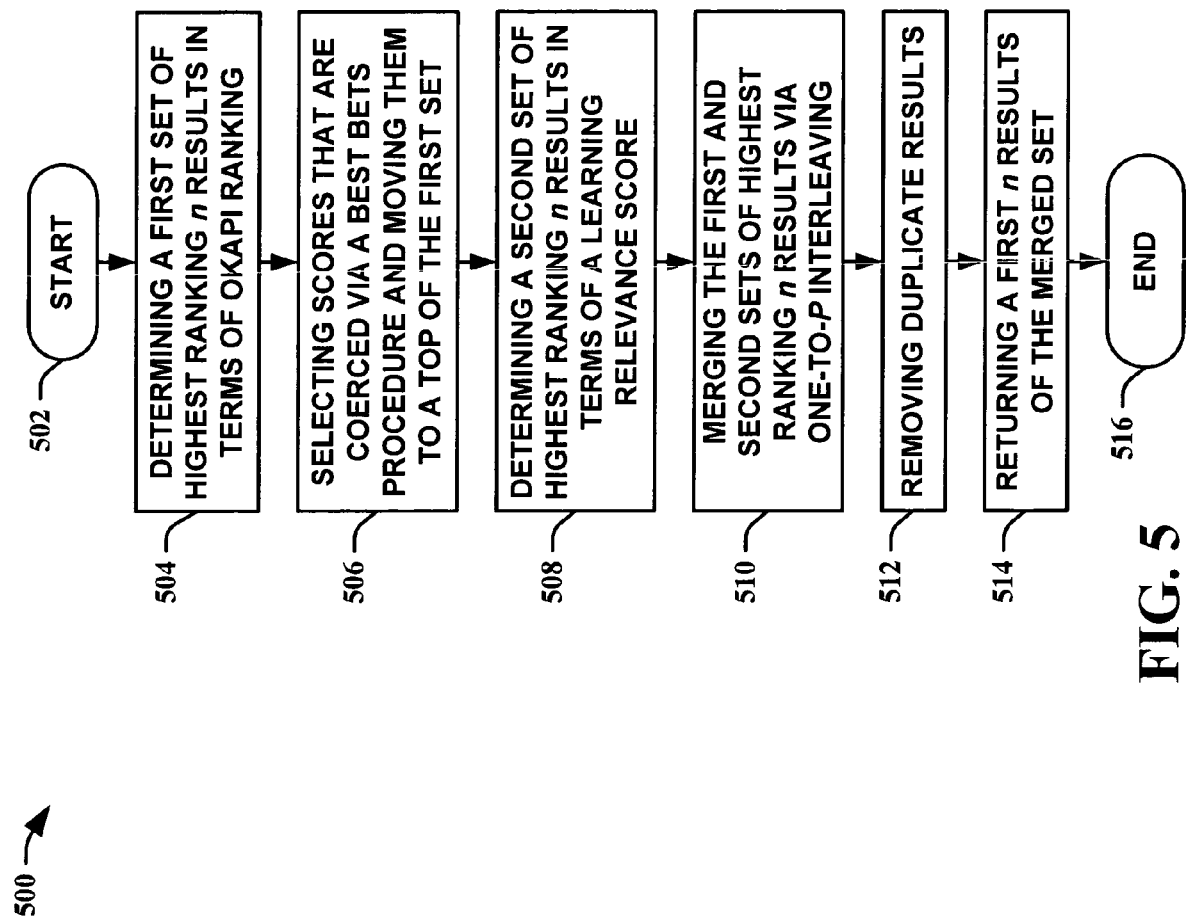
FIG. 5 is a flow diagram of a method of aggregating separately determined search query results in accordance with an aspect of the subject invention.

In view of the exemplary systems shown and described above, methodologies that may be implemented in accordance with the subject invention will be better appreciated with reference to the flow charts of FIGS. 4-5. While, for purposes of simplicity of explanation, the methodologies are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodologies in accordance with the subject invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the subject invention.

In FIG. 4, a flow diagram of a method 400 of facilitating determination of search query results in accordance with an aspect of the subject invention is shown. The method 400 starts 402 by receiving a search query 404. A plurality of search query result ranking processes, including a learning process, utilize, at least in part, a property store to separately determine search query results/answer lists for the search query 406. These processes can include OKAPI-based processes and learning processes such as those, for example, that utilize direct query feedback, aggregated question clustering feedback, and/or aggregated query concept feedback and the like generated learning models. The biasing and scoping capabilities of the property store such as, for example, a property database and/or a property-based index, can facilitate to make the processing performant. An optimum search query result relevancy ranking is then determined via aggregation of the separately determined search query results 408, ending the flow 410. The aggregation of the separately determined search query results can be accomplished utilizing, for example, weighted summation techniques and/or product summation based on selection of an á priori probabilistic relationship (e.g., naïve Bayesian modeling and/or N-gram feature modeling and the like).

Referring to FIG. 5, a flow diagram of a method 500 of aggregating separately determined search query results in accordance with an aspect of the subject invention is depicted. The method 500 starts 502 by determining a first set of highest ranking n results in terms of OKAPI ranking, where n is an integer from one to infinity 504. This can be accomplished via an existing traditional information retrieval (IR) process and the like. Scores, coerced via a best bets procedure, are then selected and moved to a top of the first set 506. A second set of highest ranking n results in terms of a learning relevance score are then determined 508. The learning relevance score can be determined via a learning model based on, for example, direct query feedback, aggregated question clustering feedback, and/or aggregated query concept feedback and the like. The first and second sets of the highest ranking n results are then merged via one-to-P interleaving, where P is an integer from one to infinity 510. Duplicate results are then removed 512. A first n results of the merged set are then returned 514, ending the flow 516. One skilled in the art can appreciate that many different aggregation techniques can be utilized to merge the results and are within the scope of the subject invention.

Figure 6:
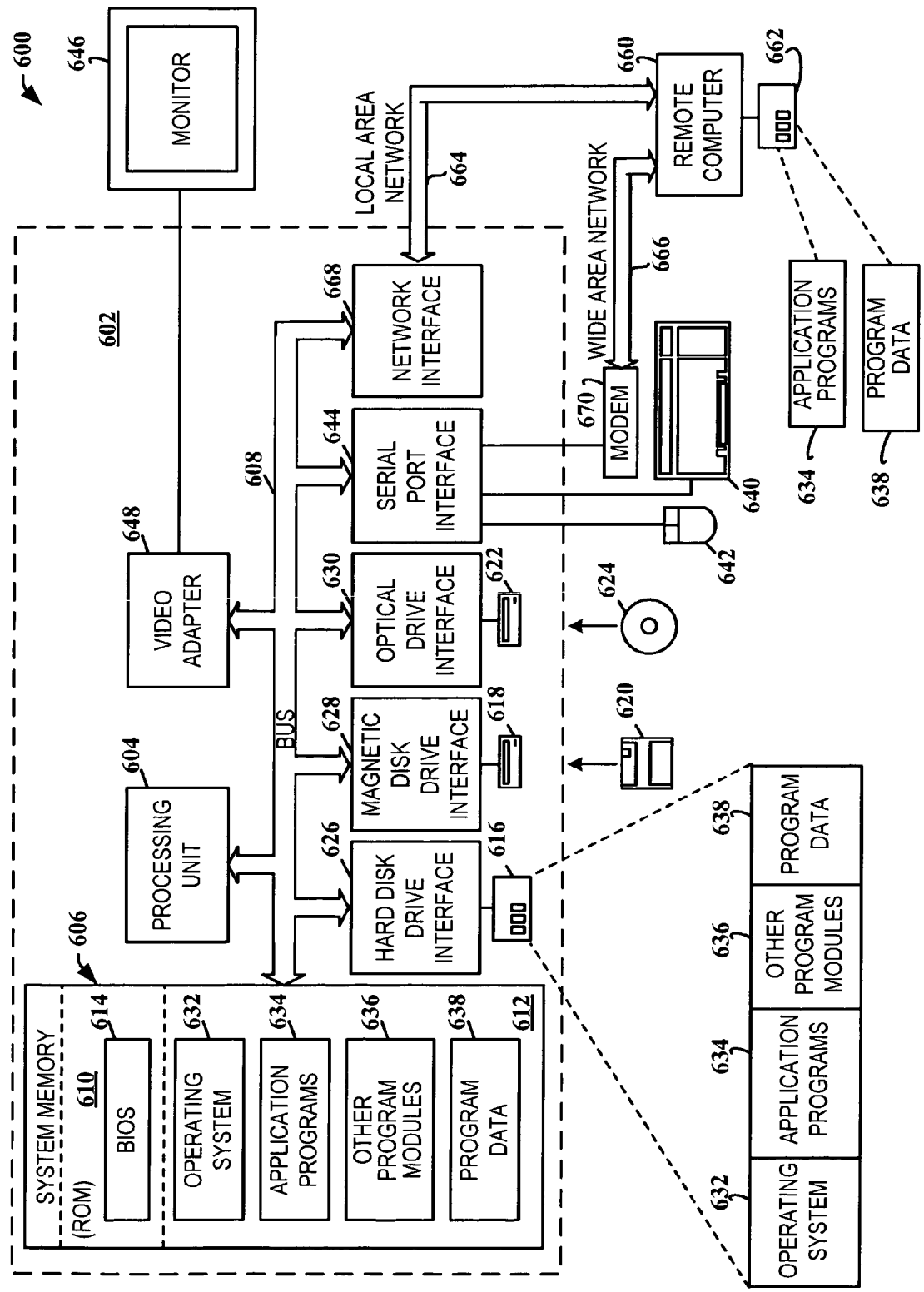
FIG. 6 illustrates an example operating environment in which the subject invention can function.

In order to provide additional context for implementing various aspects of the subject invention, FIG. 6 and the following discussion is intended to provide a brief, general description of a suitable computing environment 600 in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on standalone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 6, an exemplary system environment 600 for implementing the various aspects of the invention includes a conventional computer 602, including a processing unit 604, a system memory 606, and a system bus 608 that couples various system components, including the system memory, to the processing unit 604. The processing unit 604 may be any commercially available or proprietary processor. In addition, the processing unit may be implemented as multi-processor formed of more than one processor, such as may be connected in parallel.

The system bus 608 may be any of several types of bus structure including a memory bus or memory controller, a peripheral bus, and a local bus using any of a variety of conventional bus architectures such as PCI, VESA, Microchannel, ISA, and EISA, to name a few. The system memory 606 includes read only memory (ROM) 610 and random access memory (RAM) 612. A basic input/output system (BIOS) 614, containing the basic routines that help to transfer information between elements within the computer 602, such as during start-up, is stored in ROM 610.

The computer 602 also may include, for example, a hard disk drive 616, a magnetic disk drive 618, e.g., to read from or write to a removable disk 620, and an optical disk drive 622, e.g., for reading from or writing to a CD-ROM disk 624 or other optical media. The hard disk drive 616, magnetic disk drive 618, and optical disk drive 622 are connected to the system bus 608 by a hard disk drive interface 626, a magnetic disk drive interface 628, and an optical drive interface 630, respectively. The drives 616-622 and their associated computer-readable media provide nonvolatile storage of data, data structures, computer-executable instructions, etc. for the computer 602. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 600, and further that any such media may contain computer-executable instructions for performing the methods of the subject invention.

A number of program modules may be stored in the drives 616-622 and RAM 612, including an operating system 632, one or more application programs 634, other program modules 636, and program data 638. The operating system 632 may be any suitable operating system or combination of operating systems. By way of example, the application programs 634 and program modules 636 can include an information retrieval scheme in accordance with an aspect of the subject invention.

A user can enter commands and information into the computer 602 through one or more user input devices, such as a keyboard 640 and a pointing device (e.g., a mouse 642). Other input devices (not shown) may include a microphone, a joystick, a game pad, a satellite dish, a wireless remote, a scanner, or the like. These and other input devices are often connected to the processing unit 604 through a serial port interface 644 that is coupled to the system bus 608, but may be connected by other interfaces, such as a parallel port, a game port or a universal serial bus (USB). A monitor 646 or other type of display device is also connected to the system bus 608 via an interface, such as a video adapter 648. In addition to the monitor 646, the computer 602 may include other peripheral output devices (not shown), such as speakers, printers, etc.

It is to be appreciated that the computer 602 can operate in a networked environment using logical connections to one or more remote computers 660. The remote computer 660 may be a workstation, a server computer, a router, a peer device or other common network node, and typically includes many or all of the elements described relative to the computer 602, although for purposes of brevity, only a memory storage device 662 is illustrated in FIG. 6. The logical connections depicted in FIG. 6 can include a local area network (LAN) 664 and a wide area network (WAN) 666. Such networking environments are commonplace in offices, enterprise-wide computer networks, intranets and the Internet.

When used in a LAN networking environment, for example, the computer 602 is connected to the local network 664 through a network interface or adapter 668. When used in a WAN networking environment, the computer 602 typically includes a modem (e.g., telephone, DSL, cable, etc.) 670, or is connected to a communications server on the LAN, or has other means for establishing communications over the WAN 666, such as the Internet. The modem 670, which can be internal or external relative to the computer 602, is connected to the system bus 608 via the serial nort interface 644. In a networked environment, program modules (including application programs 634) and/or program data 638 can be stored in the remote memory storage device 662. It will be appreciated that the network connections shown are exemplary and other means (e.g., wired or wireless) of establishing a communications link between the computers 602 and 660 can be used when carrying out an aspect of the subject invention.

In accordance with the practices of persons skilled in the art of computer programming, the subject invention has been described with reference to acts and symbolic representations of operations that are performed by a computer, such as the computer 602 or remote computer 660, unless otherwise indicated. Such acts and operations are sometimes referred to as being computer-executed. It will be appreciated that the acts and symbolically represented operations include the manipulation by the processing unit 604 of electrical signals representing data bits which causes a resulting transformation or reduction of the electrical signal representation, and the maintenance of data bits at memory locations in the memory system (including the system memory 606, hard drive 616, floppy disks 620, CD-ROM 624, and remote memory 662) to thereby reconfigure or otherwise alter the computer system's operation, as well as other processing of signals. The memory locations where such data bits are maintained are physical locations that have particular electrical, magnetic, or optical properties corresponding to the data bits.

Figure 7:
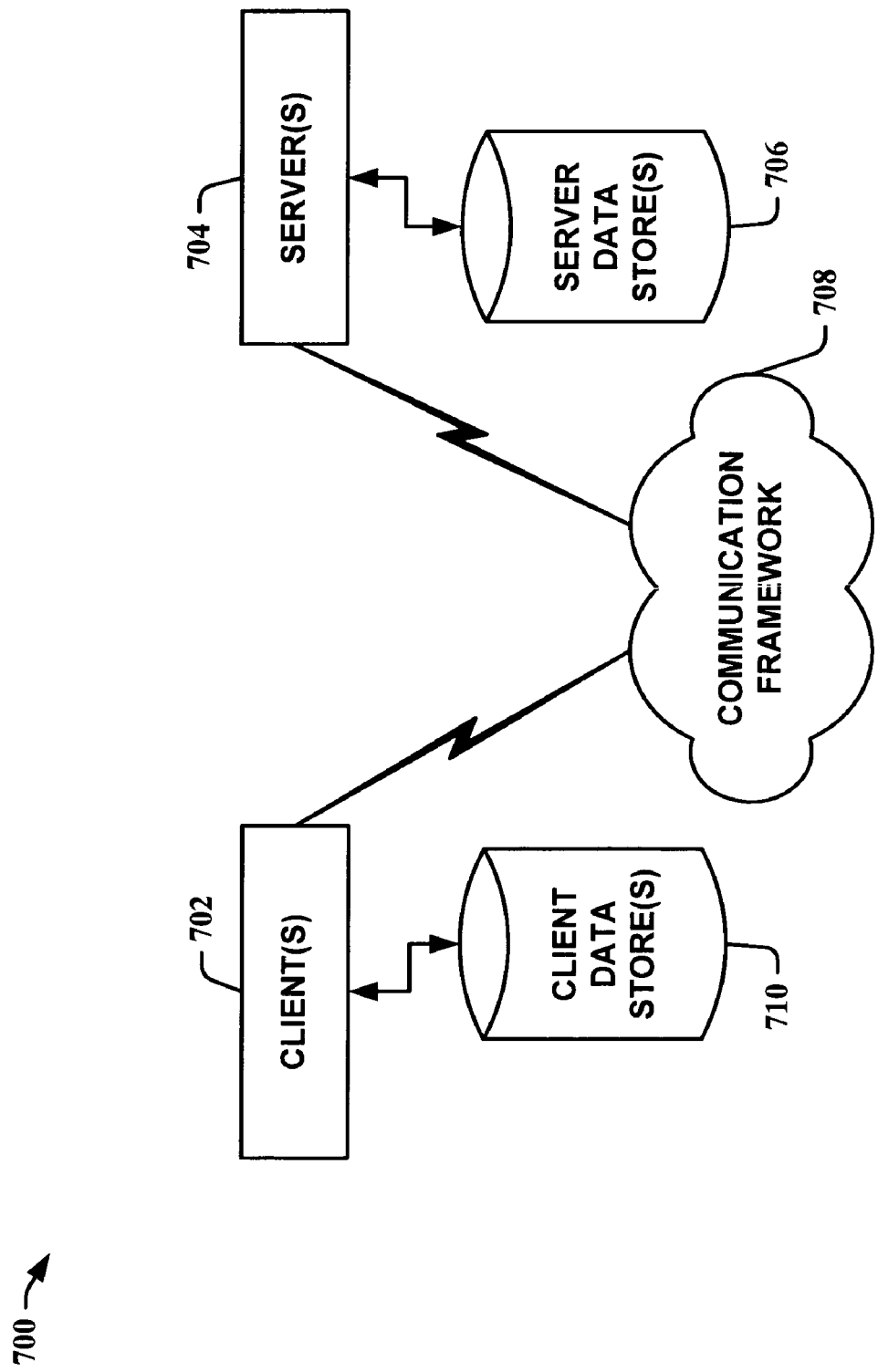
FIG. 7 illustrates another example operating environment in which the subject invention can function.

FIG. 7 is another block diagram of a sample computing environment 700 with which the subject invention can interact. The system 700 further illustrates a system that includes one or more client(s) 702. The client(s) 702 can be hardware and/or software (e.g., threads, processes, computing devices). The system 700 also includes one or more server(s) 704. The server(s) 704 can also be hardware and/or software (e.g., threads, processes, computing devices). One possible communication between a client 702 and a server 704 may be in the form of a data packet adapted to be transmitted between two or more computer processes. The system 700 includes a communication framework 708 that can be employed to facilitate communications between the client(s) 702 and the server(s) 704. The client(s) 702 are connected to one or more client data store(s) 710 that can be employed to store information local to the client(s) 702. Similarly, the server(s) 704 are connected to one or more server data store(s) 706 that can be employed to store information local to the server(s) 704.

It is to be appreciated that the systems and/or methods of the subject invention can be utilized in information retrieval facilitating computer components and non-computer related components alike. Further, those skilled in the art will recognize that the systems and/or methods of the subject invention are employable in a vast array of electronic related technologies, including, but not limited to, computers, servers and/or handheld electronic devices, and the like.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates obtaining search query results, comprising a computer readable medium having stored thereon:
   a plurality of search query result ranking components, including a learning component, that receive search query results and separately determine search query rankings for the search query utilizing, at least in part, a property store, the learning component differentiates between implicit and explicit user search query feedback in determining search query rankings; and
   a relevance component that determines an optimum search query result relevancy ranking via aggregation of the separately determined search query rankings at least in part by:
      determining a first set of highest ranking n results from the search query results in terms of OKAPI ranking, where n is an integer from one to infinity;
      selecting scores that are coerced via a best bets procedure and moving them to a top of the first set;
      determining a second set of highest ranking n results from the search query results in terms of a learning relevance score;
      merging the first and second sets of highest ranking n results via one-to-P interleaving, where P is an integer from one to infinity;
      removing duplicate results; and
      returning a first n results of the merged set.

2. The system of claim 1, the relevance component employs a weighted summation to facilitate in the aggregation of the separately determined search query rankings.

3. The system of claim 1, the relevance component employs a product summation based on selection of an á priori probabilistic relationship.

4. The system of claim 3, the product summation based on naïve Bayesian modeling and/or N-gram feature modeling.

5. The system of claim 1, the plurality of search query result ranking components including a traditional information retrieval (IR) component.

6. The system of claim 5, the traditional information retrieval (IR) component utilizes an OKAPI-based algorithm to facilitate in determining its search query rankings.

7. The system of claim 1, the learning component utilizes user click-through of search query results data to facilitate in determining its search query rankings.

8. The system of claim 7, the learning component rates explicit user search query feedback higher than implicit user search query feedback in determining search query rankings.

9. The system of claim 8, the explicit user search query feedback comprising user responses to a search query result relevancy prompt.

10. The system of claim 8, the implicit user search query feedback comprising observed heuristics.

11. A method for facilitating determination of search query results, comprising:
    receiving a search query;
    separately determining search query rankings for the search query via a plurality of search query result ranking processes, including a learning process, that utilize, at least in part, a property store to bias and/or scope the search query result ranking processes; and
    determining an optimum search query result relevancy ranking via aggregation of the separately determined search query rankings, comprising
       determining a first set of highest ranking n results in terms of OKAPI ranking, where n is an integer from one to infinity;
       selecting scores that are coerced via a best bets procedure and moving them to a top of the first set;
       determining a second set of highest ranking n results in terms of a learning relevance score;
       merging the first and second sets of highest ranking n results via one-to-P interleaving, where P is an integer from one to infinity;
       removing duplicate results; and
       returning a first n results of the merged set.

12. The method of claim 11, further comprising:
    employing a weighted summation to facilitate in the aggregation of the separately determined search query rankings.

13. The method of claim 11, further comprising:
    employing a product summation based on selection of an á priori probabilistic relationship.

14. The method of claim 13, the product summation based on naïve Bayesian modeling and/or N-gram feature modeling.

15. The method of claim 11, further comprising:
    utilizing user search query feedback to facilitate in determining learning search query rankings.

16. The method of claim 15, the user search query feedback is comprised of explicit user search query feedback, implicit user search query feedback, and/or click-through of search query results by a user.

17. The method of claim 11, further comprising:
    employing a learning process that utilizes a learning model generated from, at least in part, direct query feedback, aggregated question clustering feedback, and/or aggregated query concept feedback.

18. The method of claim 11, the property store comprising a property database and/or a property-based index.

19. A computer-implemented system that facilitates obtaining search query results, comprising a computer readable medium having stored thereon:
    means for receiving a search query;
    means for separately determining search query rankings for the search query via a plurality of search query result ranking means, including a learning means, that employ, at least in part, a property store, the learning means differentiates between implicit and explicit user search query feedback for determining search query rankings; and
    means for determining an optimum search query result relevancy ranking via aggregation of the separately determined search query rankings, comprising:
       means for determining a first set of highest ranking n results in terms of OKAPI ranking, where n is an integer from one to infinity;
       means for selecting scores that are coerced via a best bets procedure and moving them to a top of the first set;
       means for determining a second set of highest ranking n results in terms of a learning relevance score;
       means for merging the first and second sets of highest ranking n results via one-to-P interleaving, where P is an integer from one to infinity;
       means for removing duplicate results; and
       means for returning a first n results of the merged set.

20. The system of claim 19, the learning means rates explicit user search query feedback higher than implicit user search query feedback in determining search query rankings.

* * * * *